United States Patent
Mau

(10) Patent No.: US 9,826,651 B2
(45) Date of Patent: Nov. 21, 2017

(54) CASE ASSEMBLY AND LOCKING DEVICE

(71) Applicants: LITE-ON ELECTRONICS (GUANGZHOU) LIMITED, Guangzhou (CN); LITE-ON TECHNOLOGY CORPORATION, Taipei (TW)

(72) Inventor: Shu-Hua Mau, Taoyuan County (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 15/192,971

(22) Filed: Jun. 24, 2016

(65) Prior Publication Data
US 2017/0150623 A1 May 25, 2017

(30) Foreign Application Priority Data
Nov. 20, 2015 (CN) .................... 2015 2 0936934 U

(51) Int. Cl.
| | |
|---|---|
| H05K 5/00 | (2006.01) |
| H05K 5/02 | (2006.01) |
| G06F 1/16 | (2006.01) |
| H05K 5/03 | (2006.01) |
| G06F 1/18 | (2006.01) |
| G06F 21/00 | (2013.01) |

(52) U.S. Cl.
CPC ............ *H05K 5/0221* (2013.01); *G06F 1/16* (2013.01); *G06F 1/181* (2013.01); *G06F 21/00* (2013.01); *H05K 5/03* (2013.01)

(58) Field of Classification Search
CPC .. G06F 1/1679; Y10T 292/20; Y10T 292/202; Y10T 292/31; Y10T 292/323; Y10T 292/327; Y10T 292/42; Y10T 292/444; Y10S 292/11; E05B 19/08
USPC ........... 361/679.57; 70/2, 58, 163, 164, 166, 70/170; 312/223.2, 332.1, 265.5, 265.6
See application file for complete search history.

(56) References Cited

U.S. PATENT DOCUMENTS

| | | | | |
|---|---|---|---|---|
| 5,051,868 A | * | 9/1991 | Leverault ................ | G06F 1/183 361/679.6 |
| 5,673,175 A | * | 9/1997 | Carney .................... | G06F 1/181 292/202 |
| 5,751,545 A | * | 5/1998 | Jung ....................... | G06F 1/181 292/207 |

(Continued)

*Primary Examiner* — Janet M Wilkens
(74) *Attorney, Agent, or Firm* — Li & Cai Intellectual Property (USA) Office

(57) ABSTRACT

A case assembly includes a case and a locking device. The case includes a housing with an opening and at least one cover movably disposed on the housing for covering the opening. The housing includes a side plate, and the cover includes a restricting unit. The restricting unit proximal to the side plate extends outwardly along an inner surface of the cover and protrudes from an outer wall of the side plate when the cover covers the opening. The locking device is mounted on the side plate of the housing to move between an unlocked and a locked positions. The locking device can block the restricting unit of the cover when in the locked position for preventing the cover from being easily detached from the housing.

15 Claims, 5 Drawing Sheets

(56) References Cited

U.S. PATENT DOCUMENTS

| | | | | |
|---|---|---|---|---|
| 5,986,881 A * | 11/1999 | Yang | G11B 33/14 | 361/679.32 |
| 5,992,955 A * | 11/1999 | Yang | E05C 19/06 | 220/4.31 |
| 6,115,883 A * | 9/2000 | Um | F16M 11/10 | 16/405 |
| 6,182,479 B1 * | 2/2001 | Daoud | E05B 63/0043 | 292/285 |
| 7,400,936 B2 * | 7/2008 | Chang | G06F 1/184 | 361/679.33 |
| 7,726,751 B2 * | 6/2010 | Bergmann | E05B 65/02 | 312/222 |
| 8,072,767 B2 * | 12/2011 | Xue | G06F 1/185 | 312/223.1 |
| 8,297,088 B1 * | 10/2012 | Zhang | G06F 1/182 | 292/150 |
| 8,369,093 B2 * | 2/2013 | Chen | H05K 7/1408 | 248/220.21 |
| 8,498,120 B2 * | 7/2013 | Chen | H05K 5/0221 | 312/223.1 |
| 8,817,477 B2 * | 8/2014 | Vignau-Lous | B60R 11/02 | 174/55 |
| 8,950,830 B2 * | 2/2015 | Chen | G06F 1/181 | 312/223.2 |
| 8,976,536 B2 * | 3/2015 | French, Jr. | H05K 7/1427 | 16/221 |
| 2004/0107745 A1 * | 6/2004 | Williamson | E05B 65/48 | 70/2 |
| 2004/0256864 A1 * | 12/2004 | Erickson | E05B 65/006 | 292/303 |
| 2007/0125137 A1 * | 6/2007 | Galant | E05B 67/383 | 70/58 |
| 2009/0261695 A1 * | 10/2009 | Yeh | G06F 1/181 | 312/223.2 |
| 2010/0177473 A1 * | 7/2010 | Wu | F16M 11/10 | 361/679.21 |
| 2014/0016262 A1 * | 1/2014 | Lo | G06F 1/187 | 361/679.33 |
| 2016/0219731 A1 * | 7/2016 | Lin | H05K 5/0217 | |

* cited by examiner

CASE ASSEMBLY AND LOCKING DEVICE

BACKGROUND OF THE INVENTION

1. Field of the Invention

The instant disclosure relates generally to a case assembly for computers or electronic apparatuses. In particular, the present invention provides a case assembly including a case and a locking device, which prevents a cover of the case from being easily detached from a housing of the case via utilizing the locking device.

2. Description of Related Art

Conventional housings and covers of computer cases or electronic-apparatus cases are generally fastened by screws, but the use of the screws makes assembly and disassembly of the housing and the cover complicated and time-consuming. Therefore, the sliding and engaging connection for fastening the housing and the cover of the case has been developed, solving the problem of complication and time consumption utilizing the screws. Regardless of the use of the screws or the sliding and engaging connection, the cover can still be easily detached from the housing of the case, exposing the electronic components inside the housing (such as hard disc drives, optical disc drives, etc.) Accordingly, in order to avoid the electronic components inside the housing from being stolen, the locking device or series of locks can be added to lock the cover and the housing of the case together, which prevents the cover of the case from being easily detached from the housing of the case.

However, the structure of the conventional locking device is complicated and its mold cost is relatively high, resulting in higher production costs. Therefore, only one type of locking device is selected to save inventory costs. If the requirement changes, the design needs to be changed or a component needs to be added, and even the appearance may need to be changed to satisfy said requirement, thereby increasing costs, and making it hard for the price to be competitive.

In view of the above disadvantages, after an extensive research in conjunction with theoretical knowledge, the inventor provides this invention that is reasonably designed and effectively improves upon the above disadvantages.

SUMMARY OF THE INVENTION

It is an object of the present invention to provide a case assembly and a locking device with a simple structure, so that the mold cost can be lowered, and objectives of security, simplification of components, modularization, easy assembly and competitive pricing can be achieved.

It is an object of the present invention to provide a case assembly and a locking device, in which the operation of the instant disclosure is convenient and can work in conjunction with a lock-engaging member added by users by extending the design to be able to lock different types of lock-engaging members, so as to increase the security of the product, broaden the application scope and allow customers to save inventory cost caused by different locking manners.

In some implementations, a case assembly includes a case and a locking device. The case includes a housing with an opening and a cover movably disposed on the housing for covering the opening. The housing includes a side plate. The cover includes a restricting unit. The restricting unit proximal to the side plate extends outwardly along an inner surface of the cover and protrudes from an outer wall of the side plate when the cover covers the opening of the housing. The locking device is mounted on the side plate of the housing to move between an unlocked position and a locked position, wherein the locking device blocks the restricting unit of the cover when in the locked position.

Other implementation is directed to a locking device for a case assembly with a case. The case includes a housing with an opening and a cover with a restricting unit. The cover is movably disposed on the housing for covering the opening. The housing includes a side plate. The locking device comprises a flip portion and at least one first pivot portion connected to at least one end of the flip portion. Further, the locking device is pivotally disposed on the side plate by the at least one first pivot portion and to move between an unlocked and a locked positions. Accordingly, the flip portion can block the restricting unit of the cover when in the locked position.

In order to further understand the features and technical content of the instant disclosure, reference can be made to the detailed description and accompanying drawings of the instant disclosure. However, the accompanying drawings are only provided for reference and illustration, and not intended to limit the present invention.

DETAILED DESCRIPTION OF THE PREFERRED EMBODIMENTS

Figure 1:
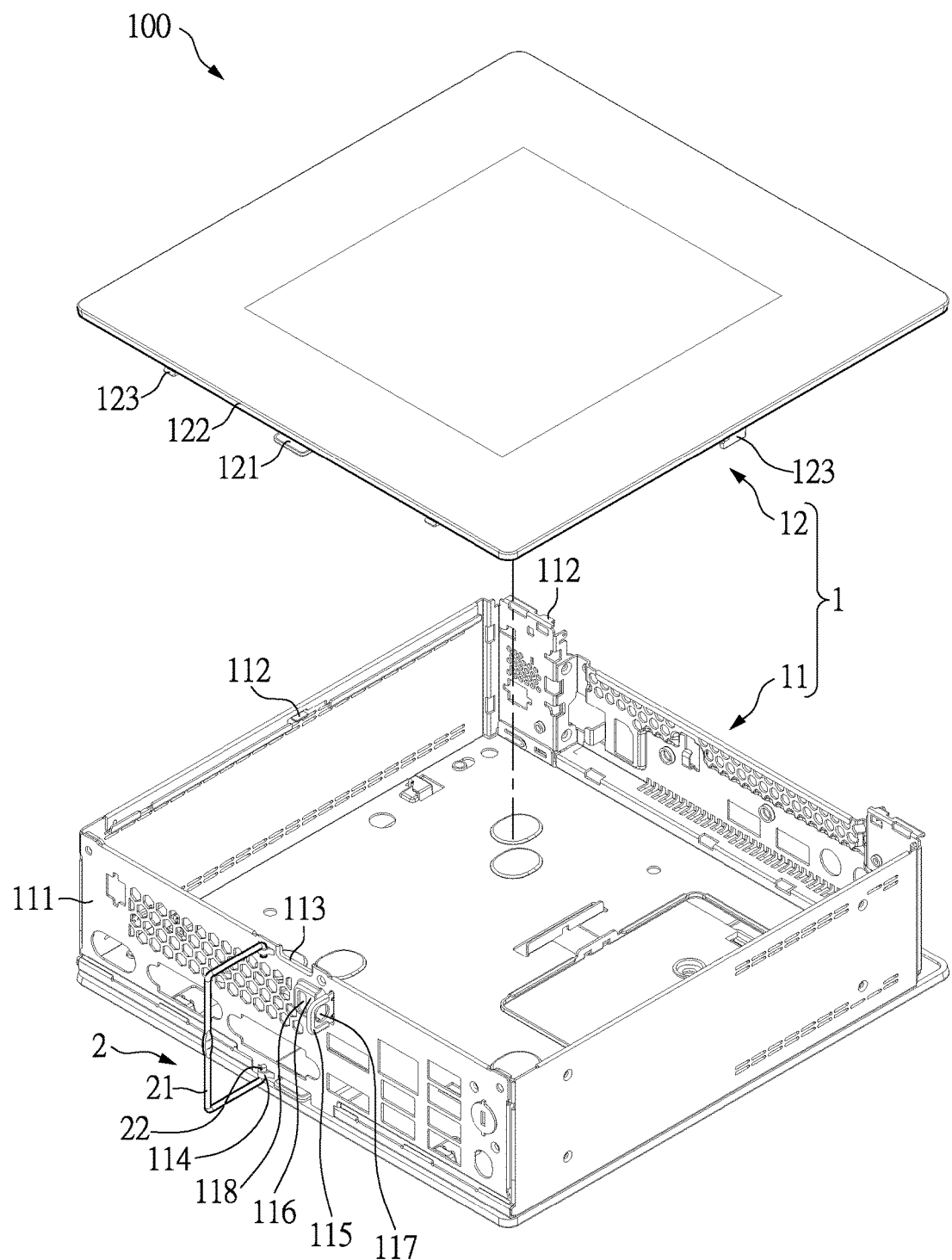
FIG. 1 shows a perspective view of a case assembly according to the instant disclosure in an unlocked state.
Figure 2:
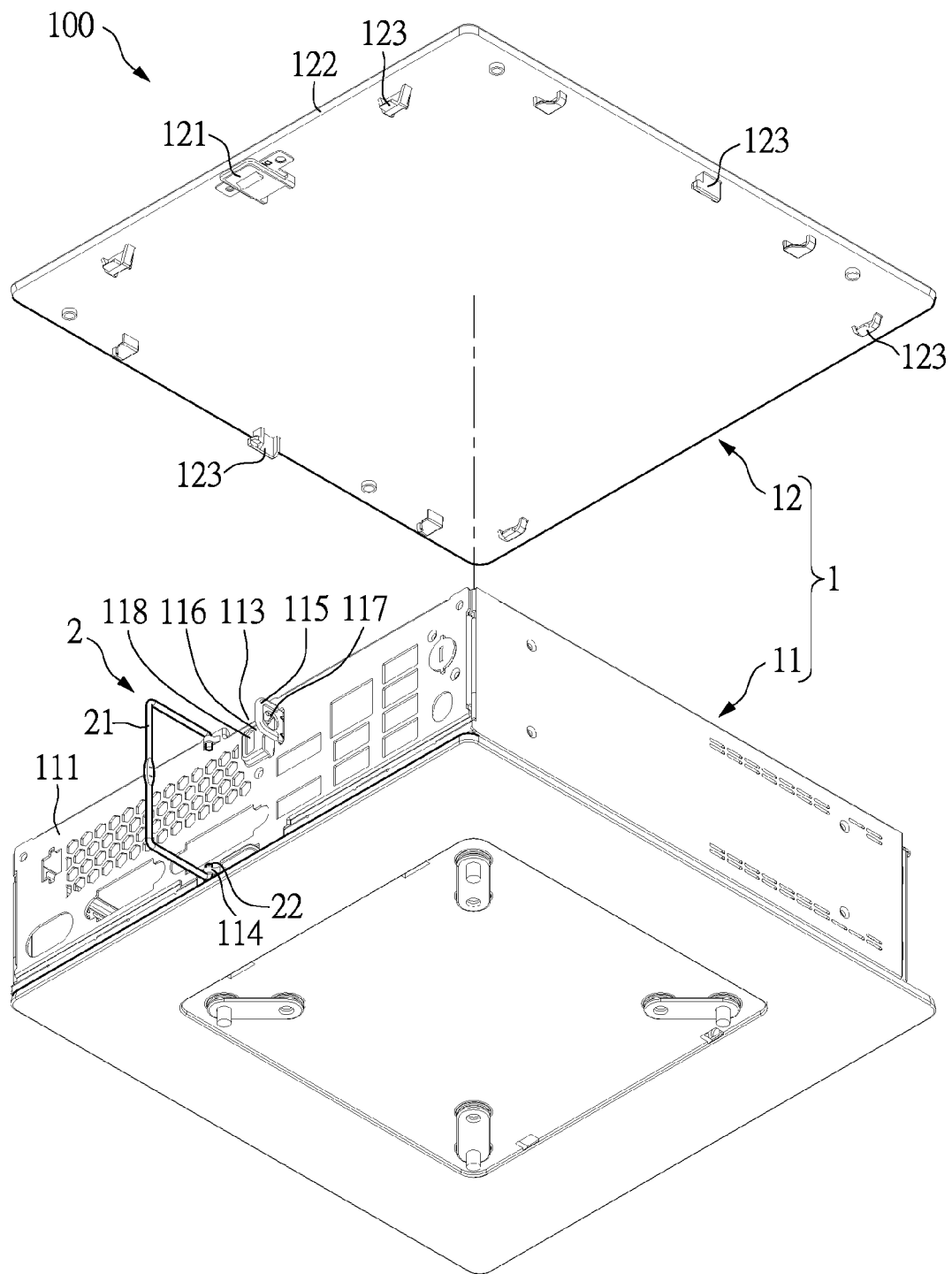
FIG. 2 shows a perspective view from another angle of a case assembly according to the instant disclosure in an unlocked state.

Please refer to FIG. 1 and FIG. 2. The instant disclosure provides a case assembly for a computer or other electronic apparatus. The case assembly 100 includes a case 1 and a locking device 2.

The case 1 includes a housing 11 and at least one cover 12. In the embodiment, the housing 11 can be a substantially rectangular hollow body which is constituted of at least four side plates, but in other applications, the present disclosure is not limited thereto. The housing 11, with a top and a bottom, includes an opening at the top and/or the bottom thereof. In the present embodiment, the housing 11 includes a rear side plate (hereinafter, referred to as a side plate 111). The interior of the housing 11 can be accommodated with the electronic components (such as PC cards, batteries, hard disc drives, optical disc drives, etc.)

The at least one cover 12 can be only one cover disposed on the opening of the top or the bottom of the housing 11 and is movable between the closed and open positions. Alternatively, the at least one cover 12 can be two covers movably disposed on the openings on the top and the bottom of the housing 11, respectively. It depends on needs for the number of the cover to cover the top and/or the bottom of the housing 11. In the present embodiment, only one cover 12 will be illustrated and described.

The cover 12 has a restricting unit 121, which can be a plate, rod, block or the like structure having the same function. The structure is not construed as being limited to the embodiments set forth herein. The restricting unit 121 can be fixedly mounted on the cover 12 by adhesive, screws, welding, riveting, bonding or any other suitable fastening means. In this embodiment, the restricting unit 121 is formed on the one side of the cover 12 proximal to the side plate 111 to extend outwardly along an inner surface of the cover 12, and the restricting unit 121 protrudes from an outer wall of the side plate when the cover 12 covers the opening of the housing 11. The side plate 111 has a limiting portion 113 formed thereon corresponding to the restricting unit 121 of the cover 12. The limiting portion 113 defines a hole, a slot, a slit or an indentation configured for receiving the restricting unit 121. When the cover 12 is in the closed position, the restricting unit 121 can pass through the limiting portion 113 and protrude from an outer wall of the side plate 111, and then is restricted to the limiting portion 113 of the side plate 111.

In other embodiments, the housing 11 includes a plurality of first engagement portions 112 formed respectively on four sides thereof proximal to the cover 12. The cover 12 includes a plurality of second engagement portions 123 formed respectively on four sides thereof corresponding to the first engagement portions 112. The first engagement portions 112 can be respectively engaged with the second engagement portions 123 when the cover 12 is moved in a given direction to cover the housing 11 in the closed position, so that the housing 11 and the cover 12 can be assembled by a sliding and engaging connection.

The cover 12 includes an eaves portion 122 formed on and extended outwardly from an edge thereof. In other words, the eaves portion 122 can protrude from the outer wall of the housing 11. Preferably, the eaves portion 122 can completely cover the restricting unit 121. Namely, the length of the eaves portion 122 protruding from the outer wall of the side plate 111 of the housing 11 is substantially equal to that of the restricting unit 121 protruding from the outer wall of the side plate 111 after passing through the limiting portion 113. In order to meet the actual needs of the design, the eaves portion 122 may be only formed on one side of the cover 12 proximal to the side plate 111. The eaves portion 122 can be extended from a part or an entire of the side of the cover 12. When the cover 12 is arranged on the housing 11 in the closed position, the eaves portion 122 can protrude from the outer wall of the side plate 111 thereby approximately covering the restricting unit 121.

At least one end of the locking device 2 is pivotally disposed on the side plate 111 of the housing 11, so that the locking device 2 can rotate relative to the side plate 111. The locking device 2 is mounted on the side plate 111 of the housing 11 to move between an unlocked and a locked position. When the cover 12 covers the housing 11 and the locking device 2 is rotated to approach the restricting unit 121 in the locked position, a part of the locking device 2 can be positioned at the top end of the restricting unit 121. Namely, the part of the locking device 2 is located between the eaves portion 122 and the restricting unit 121 when in the locked position. The locking device 2 can block the restricting unit 121 to restrict the cover 12 from being opened, so as to prevent the cover 12 from easily detaching from the housing 11.

Figure 3:
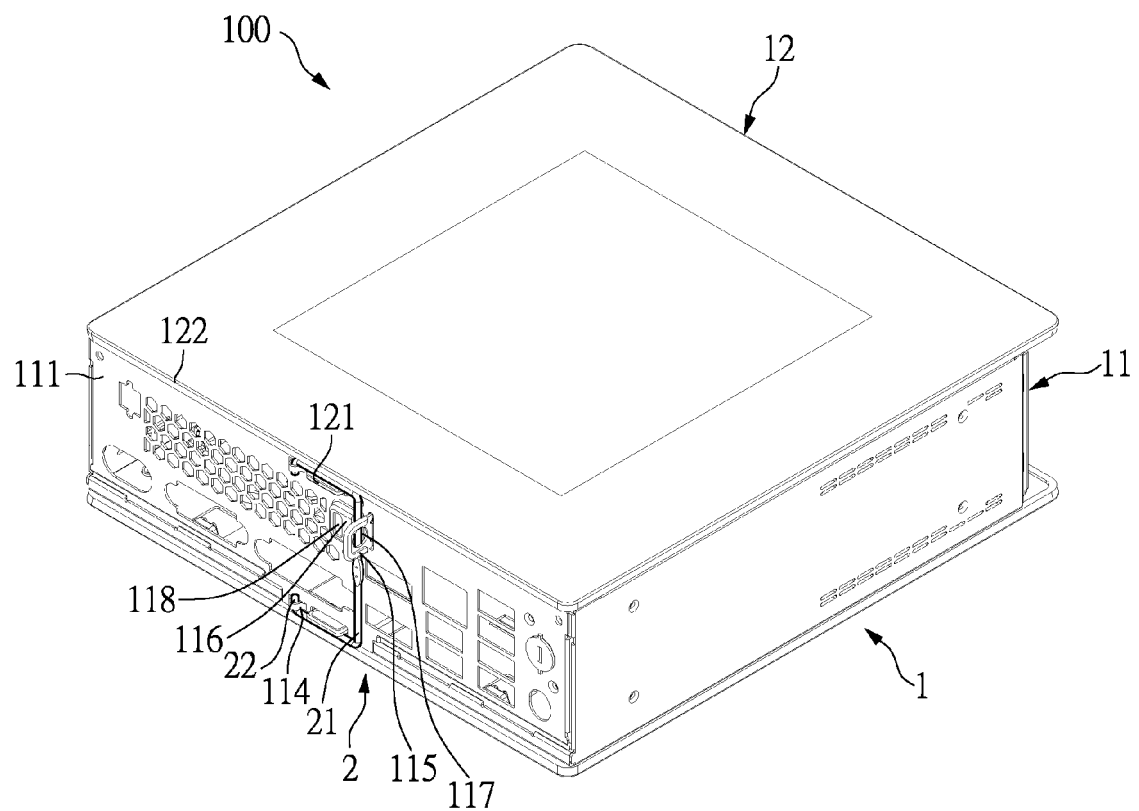
FIG. 3 shows a perspective view of a case assembly according to the instant disclosure in a locked state.

In the present embodiment, the locking device 2 is made by bending a rod body into a U-shape, ⊂-shape or C-shape, etc., which can be a metal rod body or a plastic rod body, and the shape and the material of the locking device 2 is not construed as being limited to the embodiments set forth herein. Further, the locking device 2 includes a flip portion 21 and at least one first pivot portion 22. The flip portion 21 can be bent into a U-shape, ⊂-shape or C-shape and is construed as not being limited to the embodiments set forth herein. The at least one first pivot portion 22 is connected to at least one end of the flip portion 21. The side plate 111 has at least one second pivot portion 114 pivotally connected to the at least one first pivot portion 22. In particular, the first pivot portion 22 and the second pivot portion 114 can be correspondingly arranged in quantities of one or two. The present embodiment discloses that the flip portion 21 has two first pivot portions 22 and the side plate 111 has two second pivot portions 114. The two first pivot portions 22 are respectively connected to two ends of the flip portion 21. The first pivot portions 22 can be pivots or axle holes; correspondingly, the second pivot portion 114 can be axle holes or pivots. The two first pivot portions 22 and the two second pivot portions 114 are pivotally connected to each other, so that the locking device 2 can be pivoted about the side plate 111. As shown in FIG. 3, when rotation of the locking device 2 relative to the first pivot portions 22 about the second pivot portions 114 in a direction causes the flip portion 21 to move toward the restricting unit 121, a part of the flip portion 21 of the locking device 2 is located between the eaves portion 122 and the restricting unit 121, so that the locking device 2 can securely block the restricting unit 121.

In other embodiments, only one first pivot portion 22 and one second pivot portion 114 are arranged. The first pivot portion 22 is connected to one end of the flip portion 21. The first pivot portion 22 and the second pivot portion 114 are pivotally connected to each other, so that the locking device 2 can be rotated relative to the side plate 111. Furthermore, the pivotal connection type and structure of the locking device 2 are not limited. The locking device 2 can also pivotally connected to the side plate 111 by the use of shaft, hinge or another pivotal connection structure. In other embodiments, the locking device 2 can also be a resilient wire or hook chain. The structure of the locking device 2 is not construed as being limited to the embodiments set forth herein.

Please refer to FIG. 3. The locking device 2 of the instant disclosure can be pivotally disposed on the side plate 111 of the housing 11. When the locking device 2 is rotated and approaches the restricting unit 121, the locking device 2 can block the restricting unit 121 and restrict the cover 12 from moving in the direction away from the housing 11. Therefore, the cover 12 is restricted from being opened, so that the electronic components inside the housing 11 can be prevented from being stolen.

Figure 4:
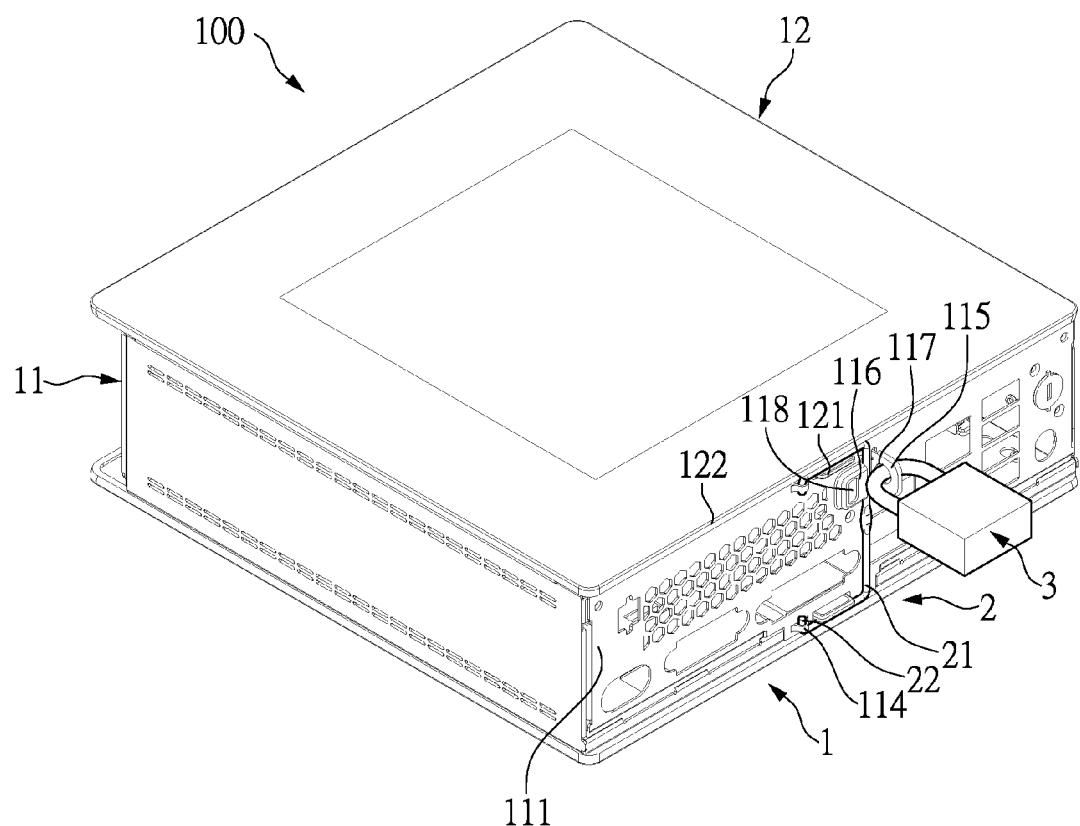
FIG. 4 shows a perspective view of a case and a locking device in conjunction with a lock-engaging member according to the instant disclosure in a locked state.
Figure 5:
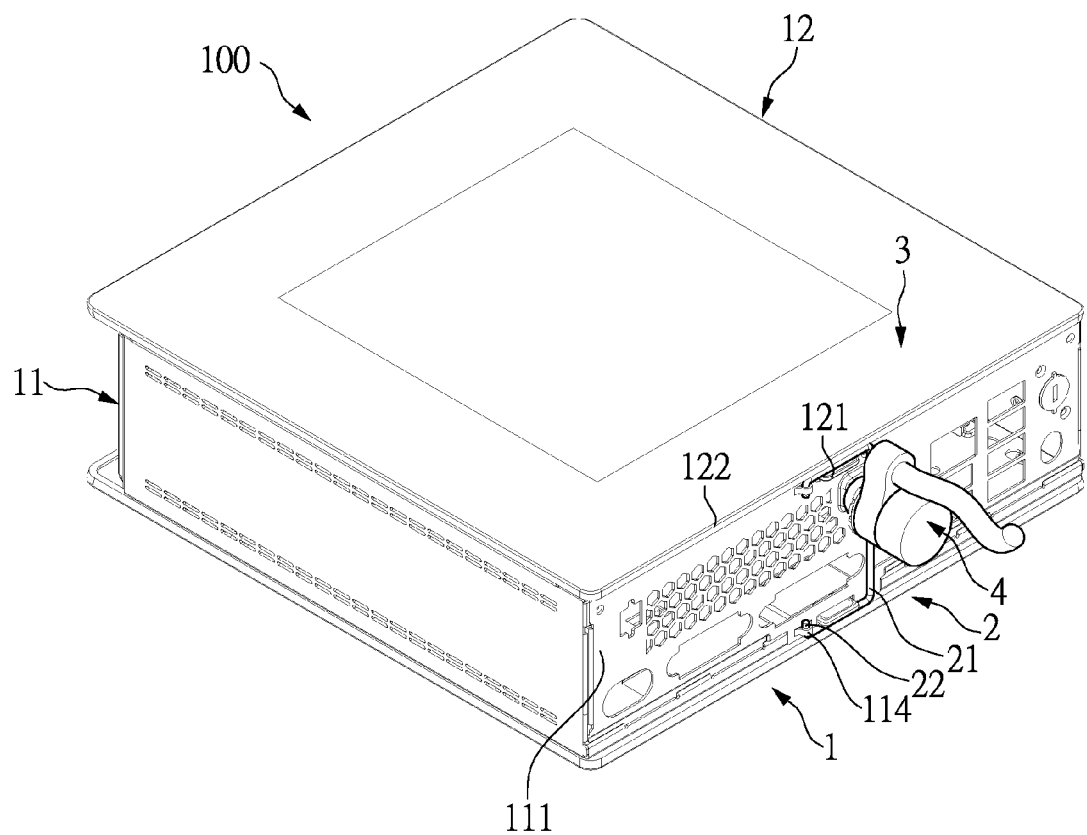
FIG. 5 shows a perspective view of a case and a locking device in conjunction with another lock-engaging member according to the instant disclosure in a locked state.

Furthermore, please refer to FIG. 4 and FIG. 5. The instant disclosure can be further equipped with a lock-engaging member. In general, in addition to cooperating with a cable to connect the case 1 to a relatively larger or fixed piece of furniture, in order to prevent the case 1 from being easily taken. In the present embodiment, the lock-engaging member can interfere with the flip portion 21 and restrict the locking device 2 from being rotated freely after the flip portion 21 of the locking device 2 blocks the restricting unit 121. In particular, the side plate 111 of the housing 11 can have a retaining member, and the lock-engaging member is engaged with the retaining member, when the locking device 2 is in the locked position, to restrict the locking device 2 from being rotated, which enhances security. The type, the size and the number of the lock-engaging member and the retaining member can be changed according to an actual requirement for a stopping and restricting function, and not be limited to the embodiments set forth herein. In this embodiment, as shown in FIG.

4, the lock-engaging member is namely a first lock-engaging member 3. As shown in FIG. 5, the lock-engaging member is namely a second lock-engaging member 4. Also, the retaining member can be a first retaining member 115 and/or a second retaining member 116.

In the embodiment, as shown in FIG. 4, the first retaining member 115 is mounted to the side plate 111 and extends in a direction substantially perpendicular to the side plate 111. The first retaining member 115 has a first locking aperture 117. The first lock-engaging member 3 can be a traditional lock, for example, a Padlock. After the flip portion 21 of the locking device 2 blocks the restricting unit 121, the first lock-engaging member 3 can be further engaged into the first locking aperture 117 of the first retaining member 115, so that the first lock-engaging member 3 can interfere with the flip portion 21 and restrict the locking device 2 from being rotated (as shown in FIG. 4). Namely, the first lock-engaging member 3 can interfere with the movement of the locking device 2 so as to achieve a better locking effect.

In the present embodiment, the second retaining member 116 is mounted to the side plate 111. The second retaining member 116 has a second locking aperture 118. The second lock-engaging member 4 can be a tether lock (e.g., a Kensington lock). Similarly, the second lock-engaging member 4 can be further engaged into the second locking aperture 118 of the second retaining member 116, so that the second lock-engaging member 4 can interfere with the flip portion 21 and restrict the locking device 2 from being rotated (as shown in FIG. 5). Namely, the second lock-engaging member 4 can interfere with the movement of the locking device 2 and achieve a better locking effect. The second lock-engaging member 4 can also cooperate with a cable to connect the case 1 to a relatively larger or fixed piece of furniture, preventing the case 1 from being easily taken.

Preferably, the side plate 111 of the housing 11 can simultaneously have the first retaining member 115 and the second retaining member 116 arranged thereon. Further, the first retaining member 115 and the second retaining member 116 are disposed opposite to each other and spaced apart a predetermined distance. The predetermined distance between the first retaining member 115 and the second retaining member 116 is provided to form a slit. The slit can be accommodated with the flip portion 21 of the locking device 2. When the locking device 2 is rotated and approaches the restricting unit 121, the flip portion 21 of the locking device 2 can be located between the slit formed by the first retaining member 115 and the second retaining member 116, so that the locking device 2 can be restricted by the first lock-engaging member 3, the second lock-engaging member 4, or by both of the first lock-engaging member 3 and the second lock-engaging member 4 at the same time, achieving a better locking effect and enhancing its security.

The locking device in the instant disclosure is pivotally disposed on the side plate, so that the locking device can be rotated relative to the side plate. When the locking device approaches the restricting unit, the locking device can block the restricting unit and, therefore, to restrict the cover from being opened and to prevent the cover from being easily detached from the housing. The structure of the locking device according to the instant disclosure is simple, so that the mold cost can be lowered and objectives of security, simplification of components, modularization, easy assembly and competitive pricing can be achieved.

Furthermore, the operation of the instant disclosure is convenient and can work in conjunction with the lock-engaging members added by users, extending the design to lock with different lock-engaging members (such as a lock, series of locks and etc.) to firmly secure the product, broaden the application scope, and allow customers to save inventory cost caused by different locking methods. To sum up, the case assembly and the locking device in this instant disclosure is not only prevent theft of the case 1, but are designed to combat theft of removable components such as PC cards, batteries, and memory drives.

However, the description above is only a preferred embodiment of the instant disclosure and is not intended to limit the scope of the instant disclosure. All equivalent changes made according to the specification and drawings of the instant disclosure fall within the scope of the instant disclosure.

What is claimed is:

1. A case assembly comprising:
a case including a housing with an opening and a cover movably disposed on the housing for covering the opening; wherein the housing includes a side plate; wherein the cover includes a restricting unit and an eaves portion formed on and extended outwardly from an edge thereof proximal to the side plate, the restricting unit proximal to the side plate being extended outwardly along an inner surface of the cover and protruded outside an outer wall of the side plate when the cover covers the opening of the housing; and
a locking device includes a flip portion and at least one first pivot portion connected to at least one end of the flip portion; wherein the side plate includes at least one second pivot portion pivotally connected to the at least one first pivot portion of the locking device; wherein the locking device is mounted on the side plate of the housing to move between an unlocked and a locked positions, wherein the locking device blocks the restricting unit of the cover when in the locked position;
wherein the eaves portion of the cover protrudes from the outer wall of the side plate of the housing, and a part of the flip portion of the locking device is movably located between the eaves portion and the restricting unit when in the locked position.

2. The case assembly according to claim 1, wherein the side plate includes a limiting portion formed on one side thereof proximal to the cover, and the restricting unit of the cover passes through the limiting portion and protrudes from the outer wall of the side plate, wherein the limiting portion is a hole, a slot, a slit or an indentation.

3. The case assembly according to claim 1, wherein the locking device is made by bending a rod body, a number of the first pivot portion is two, the two first pivot portions respectively connected to two ends of the flip portion, and a number of the second pivot portion is two, the two second pivot portions pivotally connected to the first pivot portions, respectively.

4. The case assembly according to claim 1, wherein the side plate includes at least one retaining member arranged to engage with at least one lock-engaging member, so that the at least one lock-engaging member can interfere with the movement of the flip portion of the locking device when the flip portion blocks the restricting unit.

5. The case assembly according to claim 4, wherein the at least one retaining member includes a first retaining member having a first locking aperture, the at least one lock-engaging member includes a first lock-engaging member positioned within the first locking aperture of the first retaining member, so that the first lock-engaging member can interfere with the movement of the flip portion of the locking device when the flip portion blocks the restricting unit.

6. The case assembly according to claim 5, wherein the at least one retaining member further includes a second retaining member having a second locking aperture, the at least one lock-engaging member further includes a second lock-engaging member, the other part of the flip portion of the locking device is located between the first retaining member and the second retaining member when the locking device is in the locked position, and the second lock-engaging member is positioned within the second locking aperture, so that the second lock-engaging member can interfere with the movement of the flip portion of the locking device.

7. A case assembly, comprising:
   a case including a housing with an opening and a cover with a restricting unit, wherein the cover is movably disposed on the housing for covering the opening, the housing including a side plate; and
   a locking device, wherein the locking device includes:
      a flip portion; and
      at least one first pivot portion connected to at least one end of the flip portion, wherein the locking device is pivotally disposed on the side plate by the at least one first pivot portion and to move between an unlocked and a locked positions;
   wherein the side plate includes a limiting portion formed on one side thereof proximal to the cover, and the restricting unit of the cover passes through the limiting portion and protrudes from the outer wall of the side plate;
   wherein the flip portion blocks the restricting unit of the cover when in the locked position.

8. The locking device according to claim 7, wherein the limiting portion is a hole, a slot, a slit or an indentation.

9. The case assembly according to claim 7, wherein the side plate includes at least one second pivot portion pivotally connected to the at least one first pivot portion of the locking device.

10. The case assembly according to claim 9, wherein the locking device is made by bending a rod body, the locking device includes two first pivot portions respectively connected to two ends of the flip portion, and the side plate includes two second pivot portions pivotally connected to the first pivot portions, respectively.

11. The case assembly according to claim 10, wherein the cover further includes an eaves portion formed on and extended outwardly from an edge thereof proximal to the side plate, the eaves portion protrudes from the outer wall of the side plate, and a part of the flip portion is located between the eaves portion and the restricting unit when in the locked position.

12. The case assembly according to claim 11, wherein the side plate includes at least one retaining member arranged to engage with at least one lock-engaging member, so that the at least one lock-engaging member can interfere with the movement of the flip portion of the locking device when the flip portion blocks the restricting unit.

13. The case assembly according to claim 12, wherein the at least one retaining member includes a first retaining member having a first locking aperture, the at least one lock-engaging member includes a first lock-engaging member positioned within the first locking aperture of the first retaining member, so that the first lock-engaging member can interfere with the movement of the flip portion of the locking device when the flip portion blocks the restricting unit.

14. The case assembly according to claim 13, wherein the at least one retaining member further includes a second retaining member having a second locking aperture, the at least one lock-engaging member further includes a second lock-engaging member, the other part of the flip portion of the locking device is located between the first retaining member and the second retaining member when the locking device is in the locked position, and the second lock-engaging member is positioned within the second locking aperture, so that the second lock-engaging member can interfere with the movement of the locking device.

15. A case assembly comprising:
   a case including a housing with an opening and a cover movably disposed on the housing for covering the opening, wherein the housing includes a side plate, and the cover includes a restricting unit, wherein the restricting unit proximal to the side plate extends outwardly along an inner surface of the cover and protrudes from an outer wall of the side plate when the cover covers the opening of the housing; and
   a locking device mounted on the side plate of the housing to move between an unlocked and a locked positions, wherein the locking device blocks the restricting unit of the cover when in the locked position;
   wherein the locking device is made by bending a rod body, the locking device includes a flip portion and two first pivot portions respectively connected to two ends of the flip portion;
   wherein the side plate includes two second pivot portions pivotally connected to the two first pivot portions of the locking device, respectively.

* * * * *